(12) United States Patent
Penzo

(10) Patent No.: US 7,931,237 B2
(45) Date of Patent: Apr. 26, 2011

(54) UNIVERSAL LAUNCH VEHICLE PAYLOAD ADAPTER

(75) Inventor: Leonard A. Penzo, Chino Hills, CA (US)

(73) Assignee: The Boeing Company, Chicago, IL (US)

( * ) Notice: Subject to any disclaimer, the term of this patent is extended or adjusted under 35 U.S.C. 154(b) by 180 days.

(21) Appl. No.: 11/608,231

(22) Filed: Dec. 7, 2006

(65) Prior Publication Data

US 2008/0135687 A1   Jun. 12, 2008

(51) Int. Cl.
 *B64G 1/22* (2006.01)
(52) U.S. Cl. .................... 244/173.1; 244/137.1
(58) Field of Classification Search ............... 244/173.1, 244/173.2, 173.3, 172.4, 172.5, 158.1, 137.1, 244/137.4, 159.4, 171.1; 108/55.3
See application file for complete search history.

(56) References Cited

U.S. PATENT DOCUMENTS

| | | | |
|---|---|---|---|
| 4,116,263 A * | 9/1978 | Ganssle et al. ............. | 244/173.1 |
| 4,575,029 A * | 3/1986 | Harwood et al. ........... | 244/171.1 |
| 4,867,395 A * | 9/1989 | Taylor et al. ............... | 244/173.1 |
| 5,050,821 A * | 9/1991 | Kerstein et al. ............ | 244/173.1 |
| 5,429,328 A * | 7/1995 | Dobbs et al. ............... | 244/172.5 |
| 5,848,766 A * | 12/1998 | Thompson .................. | 244/173.1 |
| 6,227,493 B1 * | 5/2001 | Holemans ................... | 244/173.1 |
| 6,275,751 B1 * | 8/2001 | Stallard et al. ............. | 244/172.4 |
| 2002/0040949 A1 * | 4/2002 | Brei et al. .................. | 244/158 R |
| 2004/0016846 A1 * | 1/2004 | Blackwell-Thompson et al. ........................... | 244/118.1 |
| 2006/0185277 A1 * | 8/2006 | Quincieu ..................... | 52/265 |

\* cited by examiner

*Primary Examiner* — Tien Dinh
*Assistant Examiner* — Richard R Green
(74) *Attorney, Agent, or Firm* — Canady & Lortz LLP; Bradley K. Lortz

(57) ABSTRACT

A universal adapter system and method for coupling payloads and launch vehicles are disclosed to provide optimum payload configurability. A modular bulkhead panel may be used that can support a plurality of payload platforms such that the layout of the plurality of payload platforms on the bulkhead panel can be altered without requiring structural redesign. A carbon composite honeycomb structural frame panel may be used. Multiple bulkhead panels can be stacked to handle larger payload weights. Hollow hexagonal keyways can be used to permit cable access to and from a missile deployment module. Hexagonal payload adapter platforms may be used to join the payload to the honeycomb bulkhead panel.

17 Claims, 10 Drawing Sheets

UNIVERSAL LAUNCH VEHICLE PAYLOAD ADAPTER

BACKGROUND OF THE INVENTION

1. Field of the Invention

This invention relates to aerospace structures. Particularly, this invention relates to launch vehicle payload support structures, such as adapters attaching a payload to a missile.

2. Description of the Related Art

Every aerospace launch vehicle, e.g., missile or rocket, must be coupled to its payload, e.g., weapon or commercial satellite. It is typical that a particular launch vehicle may be used with a range of payload types. However, under a conventional approach, a unique structural platform is designed for every unique payload to secure it to the launch vehicle or booster rocket. Thus, for every payload that may be employed with a given missile system—those currently existing and yet to be developed—a like number of payload platforms must be developed.

The requirement of a custom structural adapter design for every payload configuration can negatively impact hardware development. The new components require additional schedule to design, manufacture and test. In addition, developing new hardware also carries an increased risk of a failure, either in development or when it is first used. Of course, all of these factors bring additional costs.

Furthermore, there may be mission scenarios that will require the implementation of two or more different payloads, of varying weights and dimensions, on the same flight. For these mission scenarios it can become extremely expensive, if not impossible, to develop unique adapters to accommodate every possible payload permutation ahead of time.

In one example prior art system, the Minuteman rocket uses a payload attachment kit that provides the electrical and mechanical means to attach a single reentry vehicle to a standard payload bulkhead support assembly. The kit contains support fittings that mechanically attach the reentry vehicles to the bulkhead and is designed for only a limited number of payload configurations. Alternate configurations not covered by the kit require the design and development of costly new attachment kits that would take months, if not years, to ultimately produce.

In view of the foregoing, there is a need in the art for apparatuses and methods for structural coupling a wide range payloads to a common launch vehicle or booster rocket. Further, there is a need for such systems and methods to accommodate coupling multiple payloads to a single launch vehicle. Particularly, there is a need for such systems and methods to facilitate the development of structural interfaces without requiring excessive additional cost or schedule. These and other needs are met by the present invention as detailed hereafter.

SUMMARY OF THE INVENTION

A universal adapter system and method for coupling payloads and launch vehicles are disclosed to provide optimum payload configurability. Embodiments of the invention can use a modular bulkhead panel that can support a plurality of payload platforms such that the layout of the plurality of payload platforms on the bulkhead panel can be altered without requiring structural redesign. A carbon composite honeycomb structural frame panel may be used. Multiple bulkhead panels can be stacked to handle larger payload weights. Hollow hexagonal keyways can be used to permit cable access to and from a missile deployment module. Hexagonal payload adapter platforms may be used to join the payload to the honeycomb bulkhead panel.

A typical embodiment of the invention comprises a launch vehicle interface, including a bulkhead panel for being secured to a launch vehicle, a keyway pattern in the bulkhead panel for receiving a matching key pattern attached to one or more payload platforms, and an insert pattern of structural inserts in the bulkhead panel for securing the one or more payload platforms. The structural inserts may comprise threaded inserts, each for receiving a bolt for securing the one or more payload platforms. The bulkhead panel may be a honeycomb panel structure, made of a composite material for example. The honeycomb panel structure may be constructed as a hexagonal grid such that each of the structural inserts is positioned in each segment of the hexagonal grid.

Embodiments of the invention create a modular structure that can support a plurality of payload panels such that the layout of the plurality of payload panels can be altered at will without requiring structural redesign. In one example, the one or more payload panels can support one or more satellites for a particular mission. The one or more payload panels may be used to support one or more payload support systems and as well as one or more payloads. For example, a telemetry control unit and/or a global positioning system (GPS) unit may be positioned on the bulkhead panel on their own payload panels along with one or more satellite or weapon payloads, each on their own payload panels.

In further embodiments, one or more structural keyways of the keyway pattern may also be used as cable pathways for routing one or more support cables, routing electrical cables between payload components and the launch vehicle for example. Furthermore, in some embodiments one or more additional bulkhead panels may be stacked on the bulkhead panel to support additional payload weight.

Similarly, a typical method embodiment of the invention for coupling a payload to a launch vehicle may include the steps of securing a bulkhead panel to a launch vehicle, the bulkhead panel having a keyway pattern, receiving a matching key pattern into the keyway pattern, the matching key pattern being attached to one or more payload platforms, and securing the one or more payload platforms to the bulkhead panel by an insert pattern of structural inserts in the bulkhead panel. The method may be further modified consistent with the apparatus and system embodiments described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Embodiments of the invention can increase the overall feasibility of various missile systems by maximizing payload configurability and eliminating additional costs associated with developing numerous unique payload bulkheads. Further, embodiments of the invention can operate as a universal adapter capable of accepting multiple alternate payloads. Embodiments of the invention describe a standardized bulkhead structure suitable for supporting any desired payload affixed to a matching payload platform. The modularized structural design accommodates ready adjustability for load and size of a given payload. In addition, a combination of payload platforms may be employed supporting a plurality of different payloads.

In one notable embodiment, a bulkhead panel may be constructed as a honeycomb frame which is highly configurable. The panel may be stacked to support increased payload mass. In addition, open keyways through the panel permit cable access to and from payload platforms. The panel may be constructed from a carbon composite to provide high strength at a reduced weight.

In one example applicable system, the Prompt Global Strike (PGS) missile may be envisioned for the employment of a common booster rocket to deliver a wide range of potential weapons payloads, depending on the target type. The number of potential weapons or payloads is large and virtually unlimited. A common payload adapter would be useful to accommodate various payload permutations. All this can be accomplished while under a reduced development schedule and cost.

It should be noted that embodiments of the invention may be described herein as a payload adapter for a missile system. However, embodiments of the invention are not limited to such applications and may be applied to any aerospace launch vehicle which may be used with a range of payloads. For example, embodiments of the invention may be applicable to any rocket propelled device such as a launch vehicles for satellites or other space missions.

2. Bulkhead and Payload Panel Structures

Figure 1:
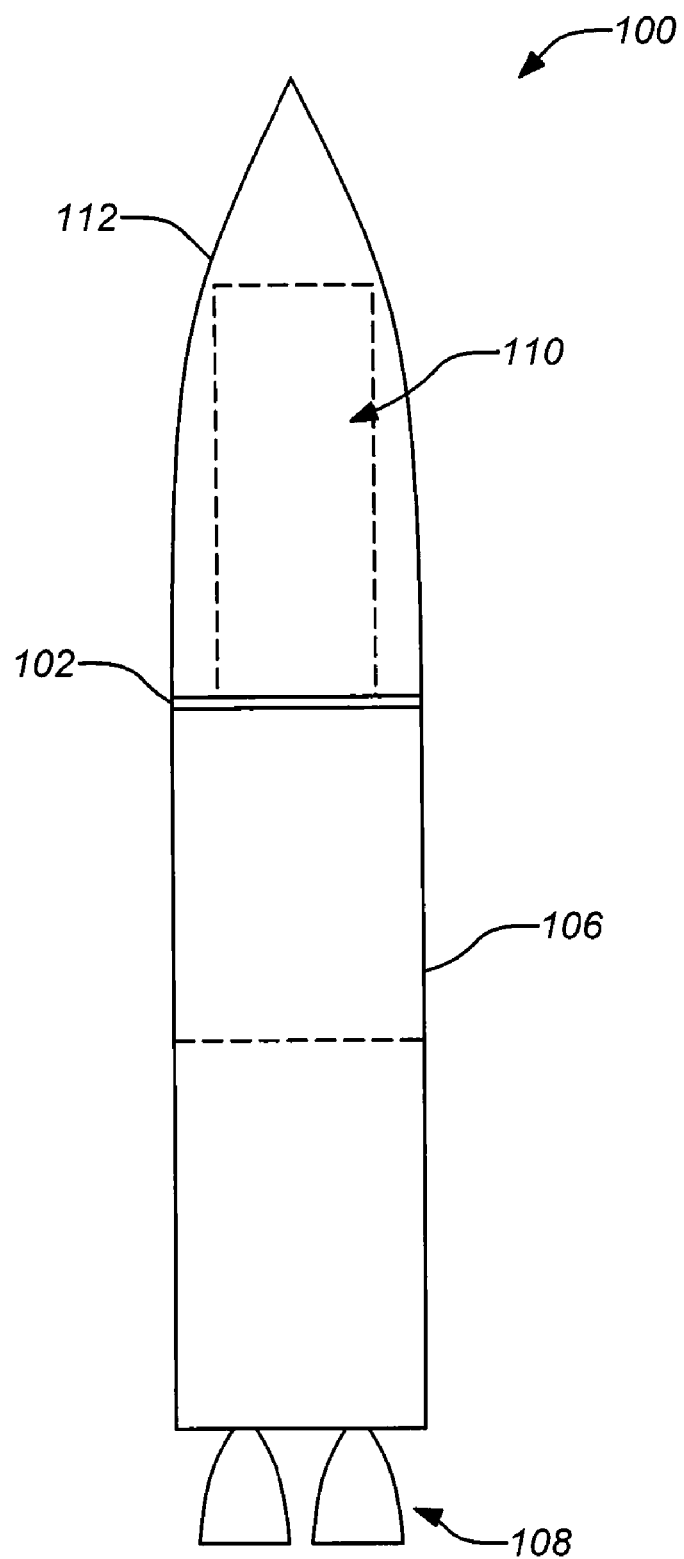
FIG. 1 illustrates a launch vehicle and interface to a payload.

FIG. 1 illustrates a launch vehicle 100 and interface 102 to a payload 110. The launch vehicle 100 may be a rocket for launching spacecraft or a missile for delivering weapon or any other rocket propelled device. The basic configuration of the launch vehicle 100 comprises a rocket body 106 which includes one or more engines 108 as well as fuel and possibly flight control as well as other systems to support operation. In addition, the rocket body 106 may include a single engine stage or may utilize one or more additional engine stages which separate and ignited in sequence. With any launch vehicle 100 configuration, however, a payload interface 102 is employed to structurally tie the payload 110 to the rocket body 106. The payload 110 is positioned at the head of the launch vehicle 100 under a fairing 112 which will typically break away when the payload is finally delivered.

Figure 2A:
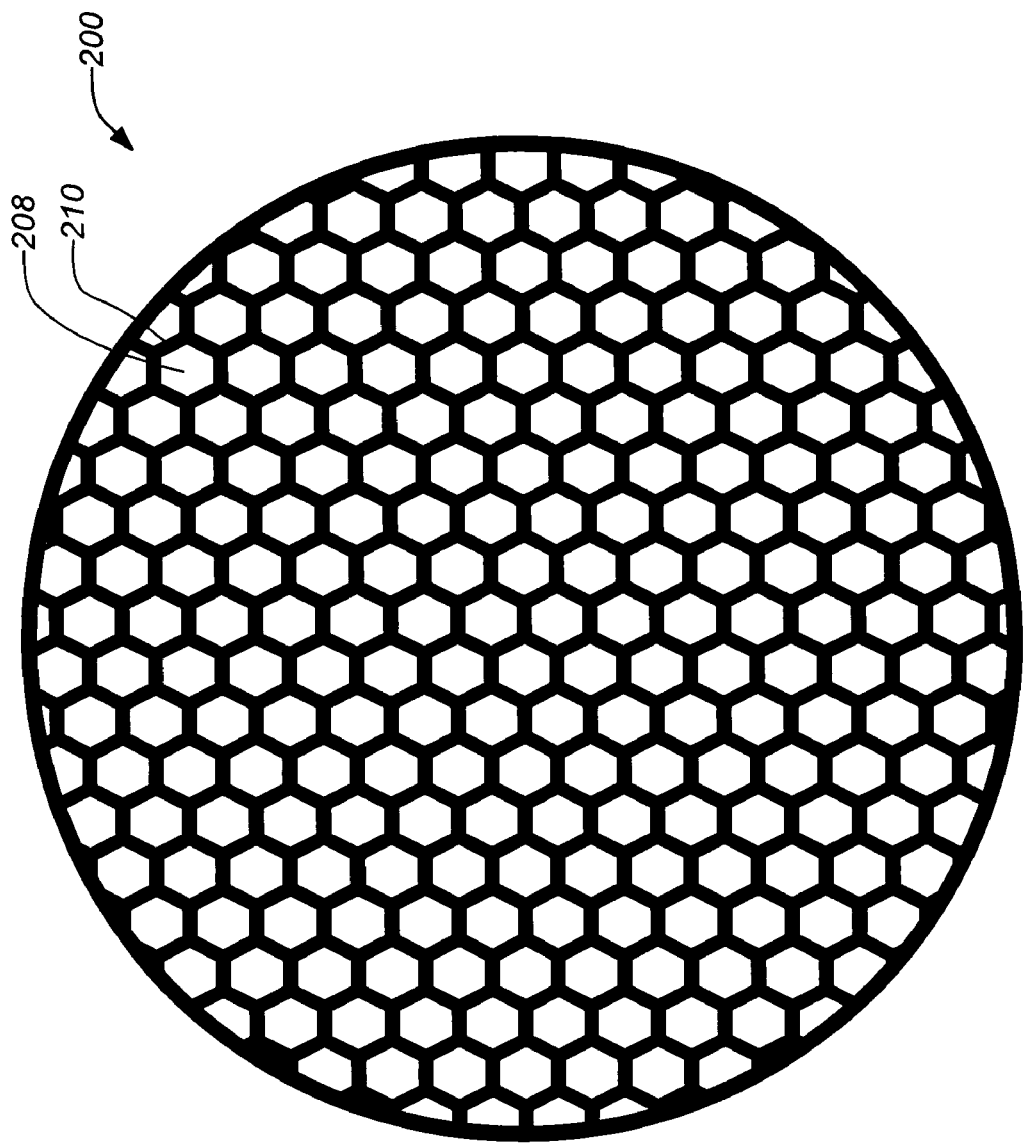
FIG. 2A illustrates an exemplary bulkhead panel for an embodiment of the invention.
Figure 2B:
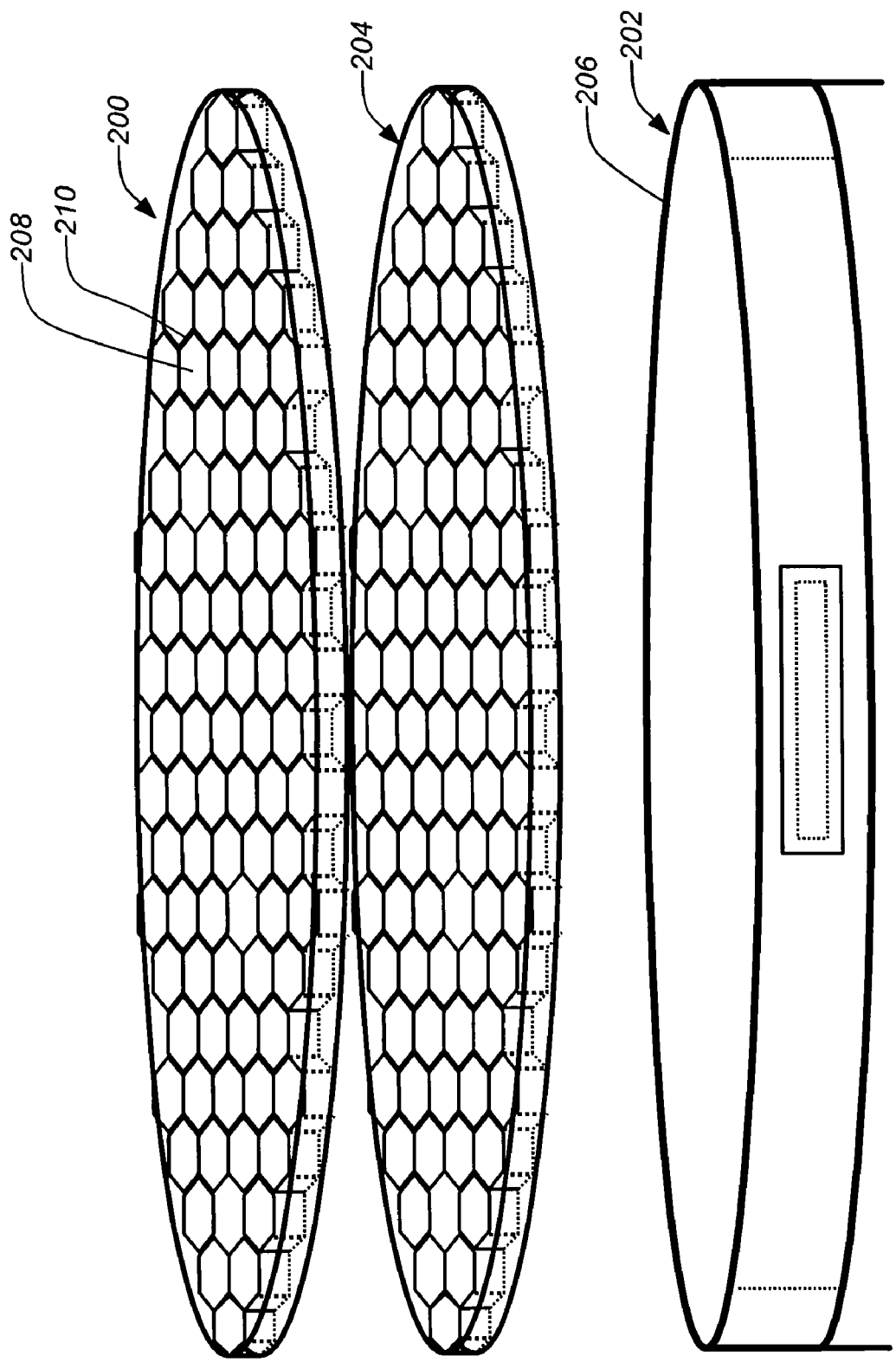
FIG. 2B illustrates a plurality of bulkhead panels for an embodiment of the invention.

FIGS. 2A & 2B illustrate an exemplary bulkhead panel 200 for an embodiment of the invention. The bulkhead panel 200 may be configured as a honeycomb panel structure comprising interconnected hexagonal cells. The honeycomb panel structure comprises a grid of hexagonal cells, each formed from six segments 210 to close an open keyway 208 through the bulkhead panel 200 and each segment 210 is shared with adjacent cells. The bulkhead panel 200 may be secured to a launch vehicle 202 at its periphery 206 with appropriate brackets. If required by the load, additional cross members (not shown) may be used across the open end of the launch to further support the bulkhead panel 200. However, in some embodiments structural reinforcement of the bulkhead panel 200 may be accomplished by simply stacking one or more additional bulkhead panels 204 under the first bulkhead panel 200. It should be noted that embodiments of the invention may also employ bulkhead panels having alternate structures as long as some pattern of keyways is provided in the bulkhead panel 200 which will be used to engage payload platforms described hereafter.

The bulkhead panel 200 may be constructed from a composite material, such as a carbon fiber, Kevlar, aluminum (such as aluminum honeycomb panels) or any other known materials suitable for aerospace structures. For example, one structural material often used in aerospace comprises a fine honeycomb core (of very small thin walled interconnected aluminum hexagonal cells) sandwiched between aluminum or composite facesheets. Materials such as this may be cut to form the larger bulkhead panel 200 which may be further reinforced as necessary. Specific embodiments can be readily developed by those skilled in the art applying conventional aerospace structural design principles and techniques.

Figure 3A:
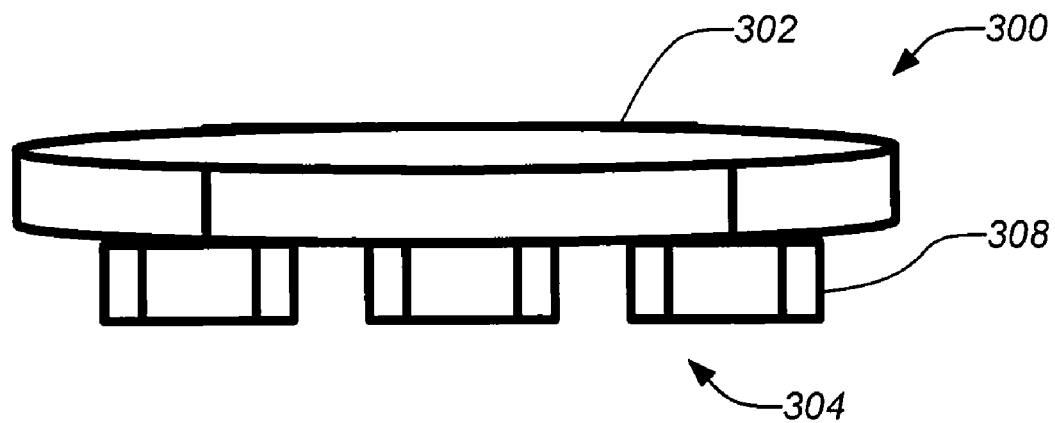
FIGS. 3A & 3B illustrate an exemplary payload platform for coupling to a bulkhead panel.
Figure 3B:
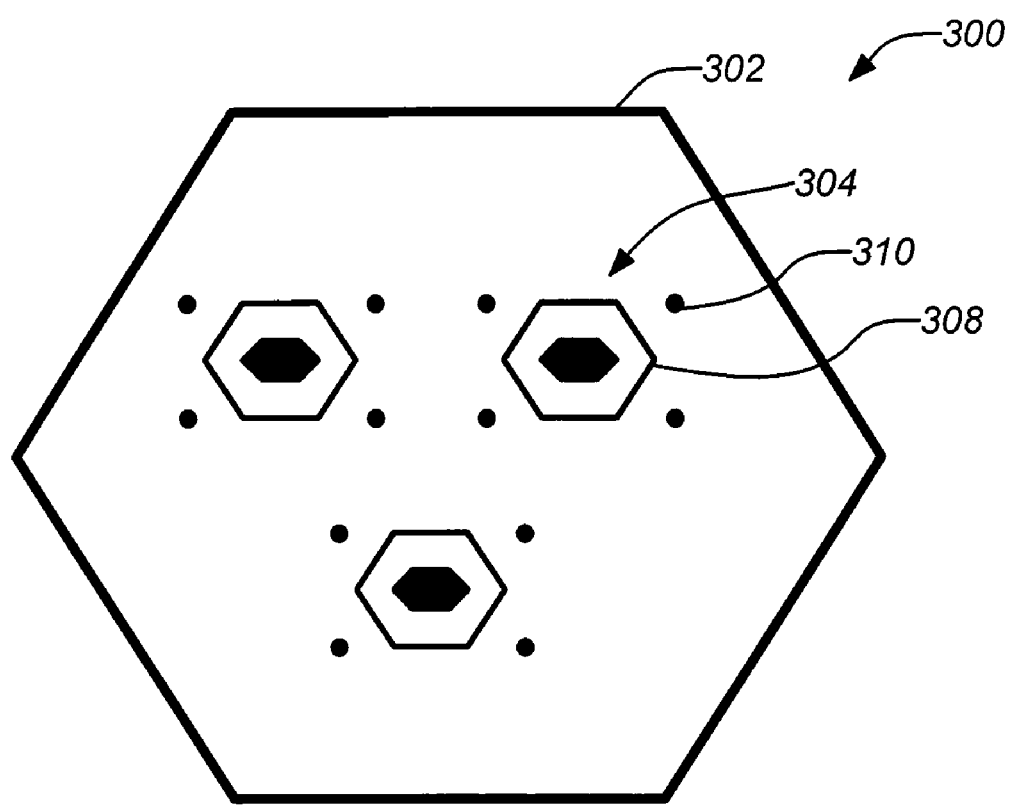

FIGS. 3A & 3B illustrate an exemplary payload platform 300 for coupling to a bulkhead panel 200. The payload platform 300 comprises a payload panel 302 that is used to directly support a given payload, e.g. weapon, satellite, etc., affixed to its top surface in use. In addition, a pattern 304 of keys 308 on the lower surface of the payload panel 302 which are matched to engage an available pattern of keyways on the bulkhead panel 200. In the example, each key 308 is hexagonal and sized to engage a matching hexagonal cell in the bulkhead panel 200. In addition, the payload panel 302 of the payload platform 300 also includes through holes 310 or some other feature which are used to structurally secure the payload platform 300 to the bulkhead panel 200, e.g. with threaded bolts or other fasteners. The payload platforms 300 may be constructed of the same range of materials that are applicable to the construction of the bulkhead panel 200 described above. Configurability of the interface to accommodate different payload applications is discussed in the next section.

3. Configurable Keyways and Keys Coupling Payload and Bulkhead Panels

Figure 4:
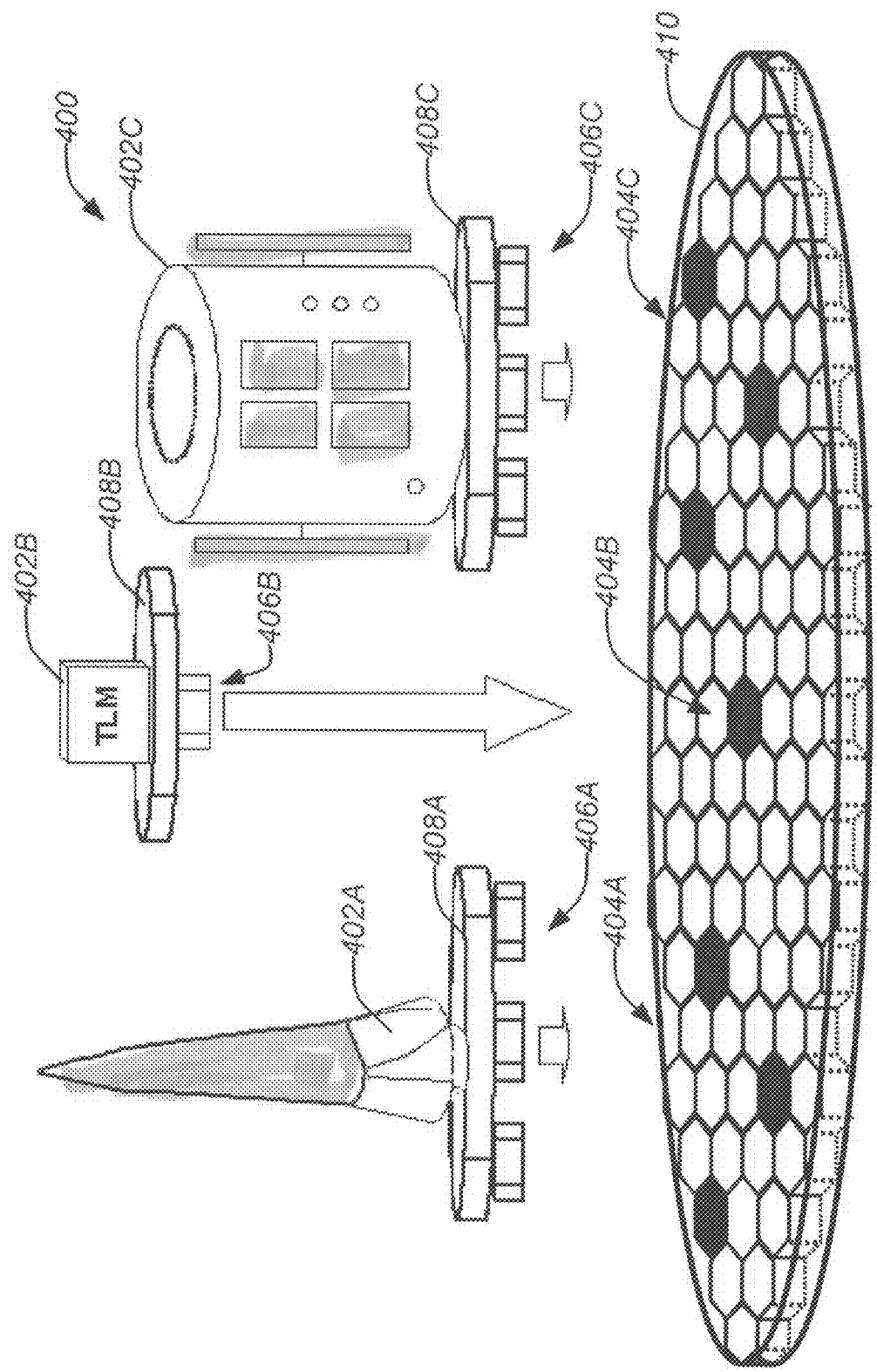
FIG. 4 illustrates keyways and keys used to couple payload platforms to a bulkhead panel.

FIG. 4 illustrates keyways and keys used to couple payload platforms to a bulkhead panel in an exemplary payload adapter system 400. One important advantage afforded embodiments of the invention is the ability to be readily configured to support different payloads 402A-402C. For example, a weapon payload 402A, a telemetry control payload 402B and a satellite payload 402C are a few examples of payload types that may be used with embodiments of the invention. This versatility is facilitated through the distinct keyway patterns 404A-404C that can accommodate the matching key patterns 406A-406C of the payload platforms 408A-408C by the bulkhead panel 410. The various payloads 402A-402C may be coupled to the bulkhead panel 410 alone or in combination depending upon the particular mission design.

It should be noted that the repeating hexagonal grid (or any similar repeating pattern) of the bulkhead panel 410 affords enhanced versatility to accommodate a large number of payload platforms in different locations and orientations. This is due in part because the bulkhead panel 410 incorporates a repeating pattern with six-fold symmetry. Thus, the key pattern 406C for the satellite payload platform 408C may be relocated into any available location on the bulkhead panel 410 and may be reoriented in sixty degree increments. (The individual keyways of the keyway patterns 404A-404C are only marked in black in FIG. 4 for illustration purposes; there is no structural difference in keyways of the patterns from all the other keyways of the grid.) It will be understood by those skilled in the art that other bulkhead panel designs with other keyway patterns may be developed within the scope of the invention. For example, other repeating symmetric patterns may be readily developed to accommodate coupling bulkhead panels and payload platforms.

Figure 5A:
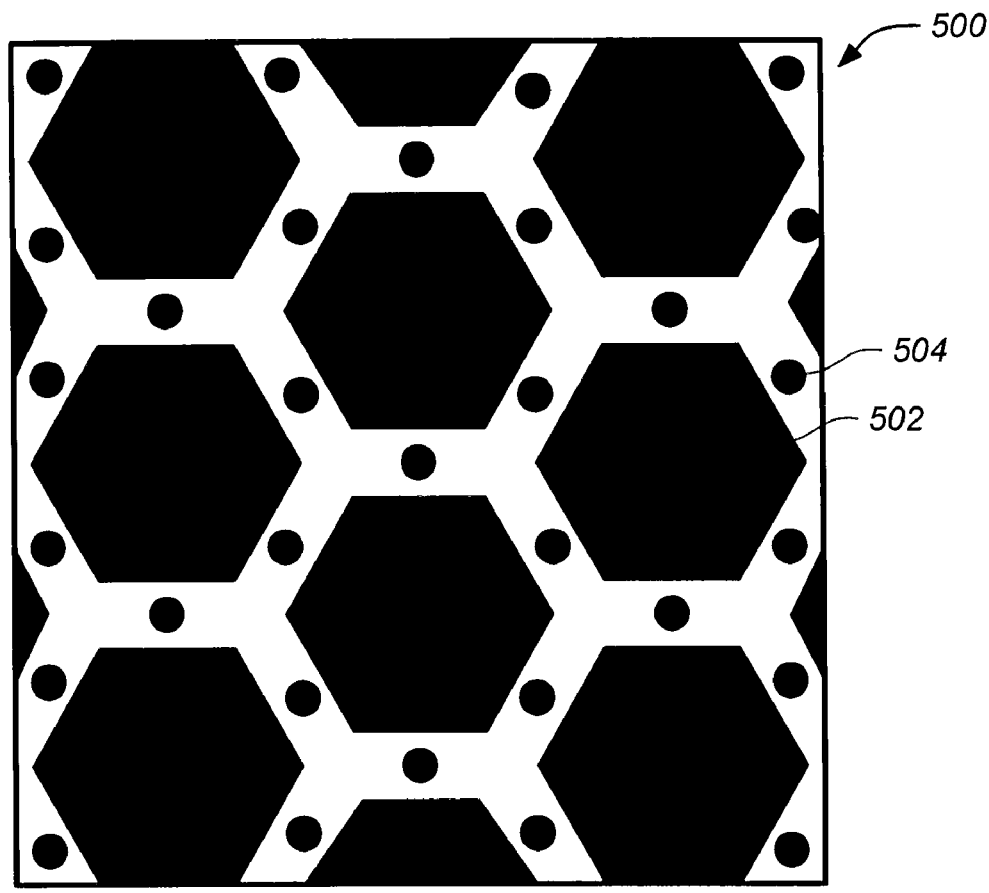
FIGS. 5A & 5B illustrate an exemplary bulkhead structure and mechanical interface.
Figure 5B:
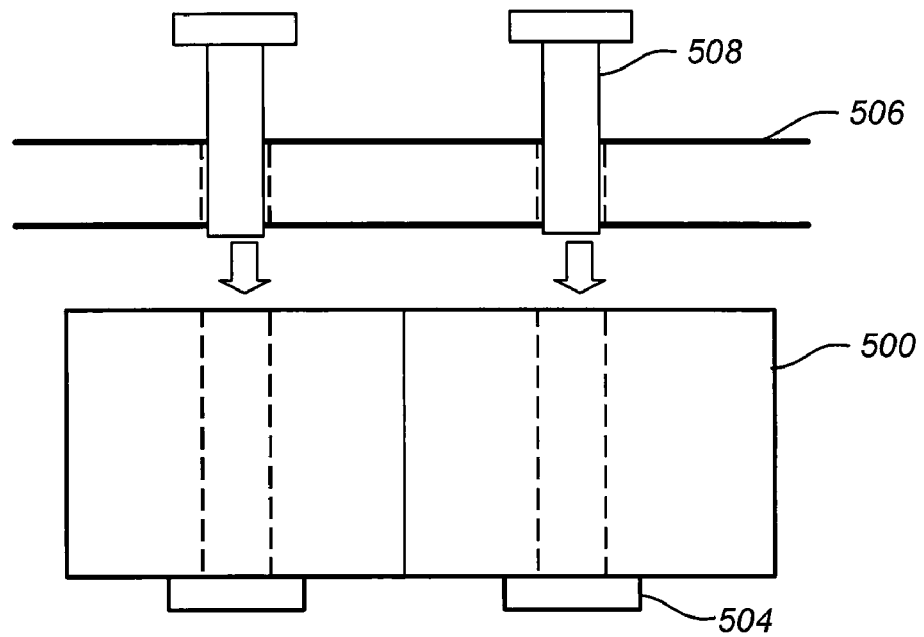

FIGS. 5A & 5B illustrate an exemplary bulkhead panel structure and mechanical interface. The bulkhead panel 500 may comprise a frame or grid comprised of repeating hexagonal keyways 502 which also may provide structural support of the coupled payload platforms, e.g. carrying shear loads between the panels. As previously described, the keyways 502 may also be used as convenient cable pathways for routing support cables (electrical or other) between the payloads and the launch vehicle. Structural inserts 504 may be embedded in the grid at various locations to secure the one or more payload platforms 506 to the bulkhead panel 500.

As shown in FIG. 5B, the structural inserts 504 may be threaded inserts, each for receiving a bolt 508 for securing the one or more payload platforms 506. Each of the structural inserts 504 may be disposed in each segment of the hexagonal grid of the bulkhead panel 500 in the example.

4. Exemplary Mission Applications of a Universal Adapter

Embodiments of the invention can be used to support a variety of different missions which may include one or more payload types coupled to the bulkhead panel. For example, the one or more payload panels may be used to support one or more satellites or the one or more payload panels may be used to support one or more payload support systems and one or more payloads. Payload support systems may include telemetry (TLM) modules or global positioning system (GPS) used to operate the particular payload.

Figure 6A:
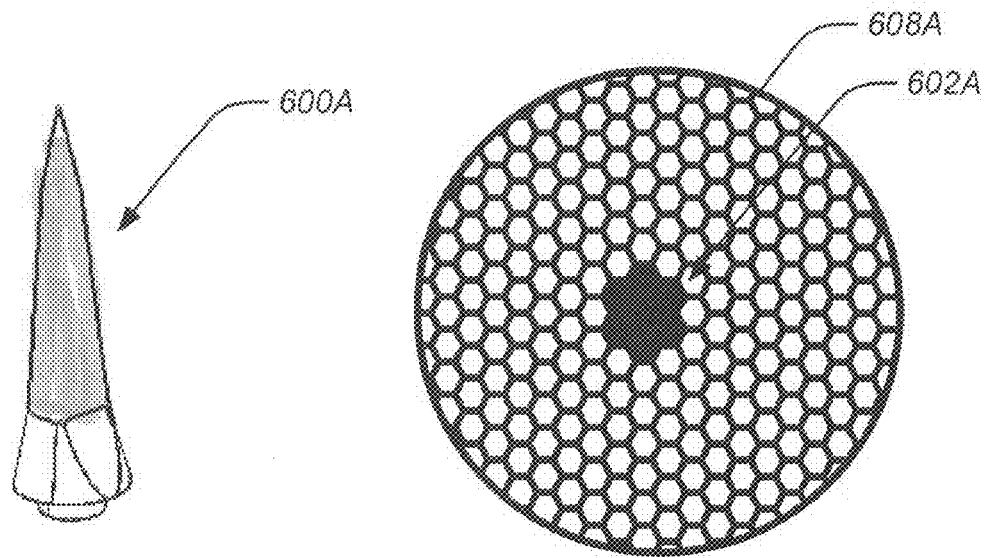
FIGS. 6A to 6E illustrates some exemplary platform configurations for embodiments of the invention.
Figure 6B:
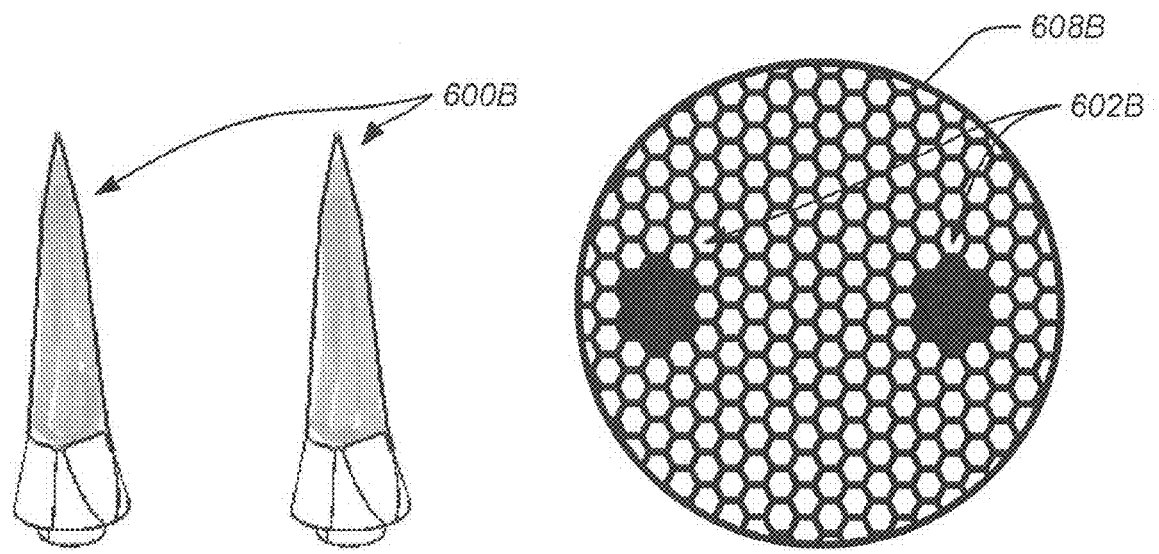
Figure 6C:
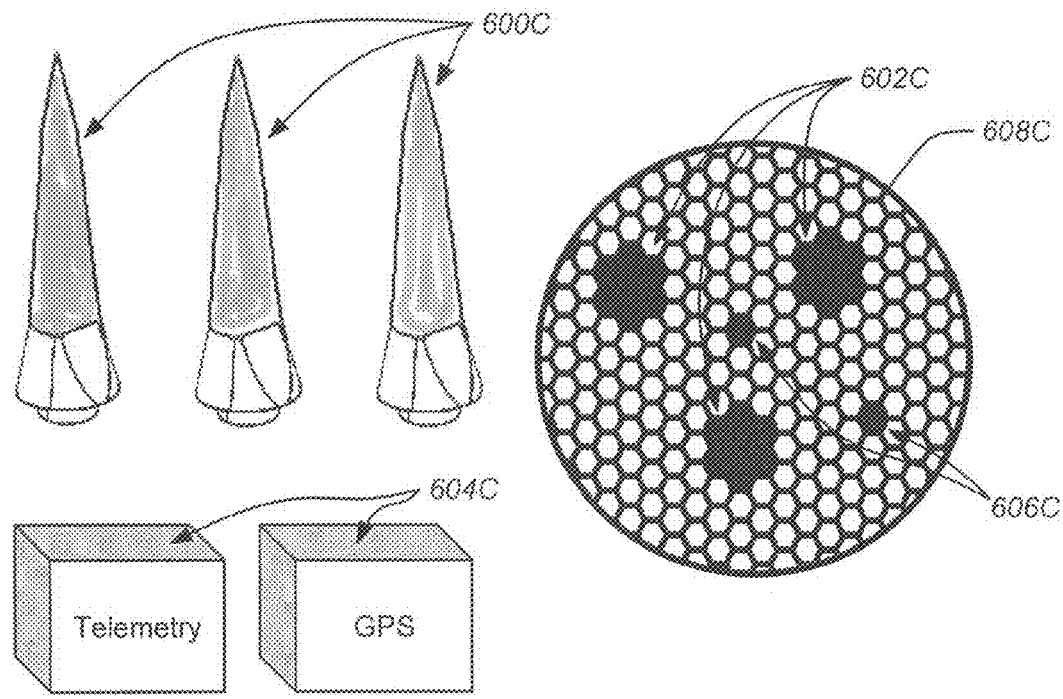

FIGS. 6A to 6C illustrate some exemplary weapon payload platform configurations for embodiments of the invention. FIG. 6A illustrates a basic configuration of a weapon payload 600A and an applicable keyway pattern 602A for mounting a payload platform supporting the weapon payload 600A. The pattern 602A is centrally disposed on the bulkhead panel 608A. FIG. 6B illustrates a configuration supporting a pair of weapon payloads 600B which are coupled to the bulkhead panel 608B at two separate keyway patterns 602B. FIG. 6C illustrates another configuration of three weapon payloads 600C which are now coupled to the bulkhead panel 608C by three separate patterns 602C. In addition, secondary payloads 604C (e.g., telemetry and GPS) may also be coupled to the bulkhead panel 608C by separate patterns 606C.

Figure 6D:
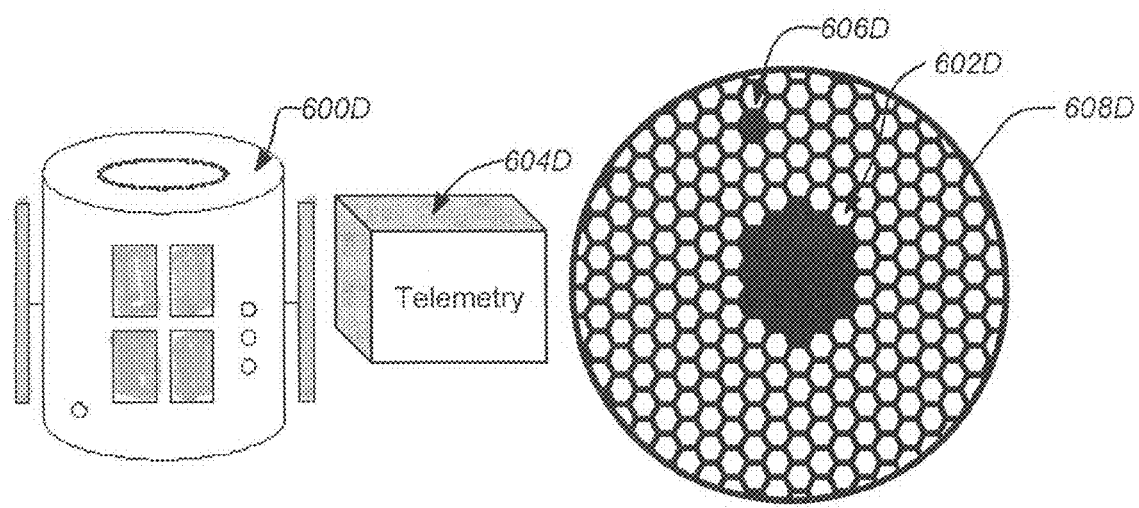

FIG. 6D illustrates an exemplary communications satellite payload platform configuration embodiment of the invention. In this embodiment the bulkhead panel 608D has a keyway pattern 602D to receive the satellite payload 600D fixed to the matching payload platform. In addition, a second payload 604D telemetry unit is located on the bulkhead panel 608D at a single keyway pattern 606D.

Figure 6E:
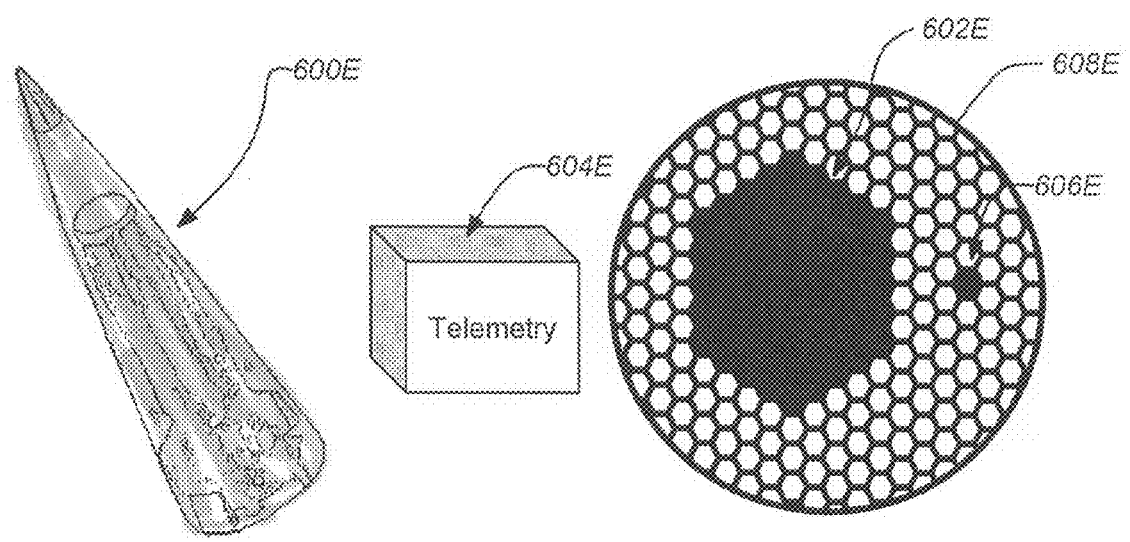

FIG. 6E illustrates another weapon payload configuration embodiment of the invention. In this case the single weapon payload 600E is quite large and requires an expansive pattern 602E on the bulkhead panel 608E. In addition, a seconday payload 604E telemetry unit is also located on the bulkhead panel 608E at a single keyway pattern 606E.

These and other payload configurations may be readily developed by those skilled in the art. The payload platform layout may be quickly designed and moved immediately to analysis and testing. It is also possible that a relatively minor amount of custom structural reinforcement may be applied to close a particular mission design as necessary.

Currently, various launch vehicles including space rockets and intercontinental ballistic missiles (ICBMs) as well as short range missiles require unique bulkheads or adapters that must be developed and employed for each payload. Specific detailed applications for various launch vehicles, e.g., Minotaur, Delta, Atlas, Arianne, can be readily developed according to the description provided here as will be understood by those skilled in the art.

5. Method of Coupling a Payload to a Launch Vehicle

Figure 7:
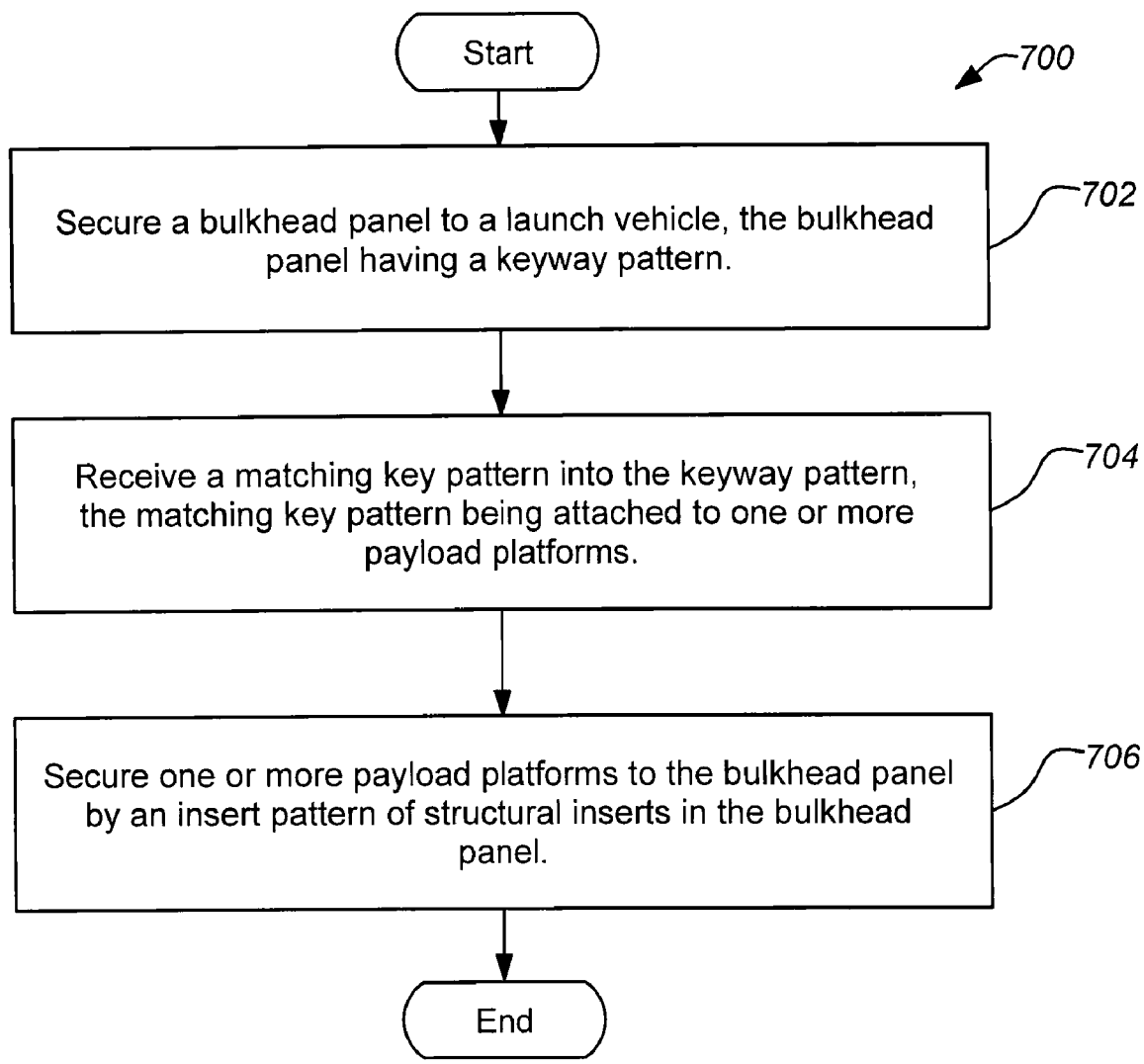
FIG. 7 is a flowchart of a exemplary method of coupling a payload to a launch vehicle.

FIG. 7 is a flowchart of a exemplary method 700 of coupling a payload to a launch vehicle. The method 700 of coupling a payload to a launch vehicle begins with the operation 702 of securing a bulkhead panel to a launch vehicle, the bulkhead panel having a keyway pattern of structural keyways. Next, in operation 704 matching structural keys are received into one or more of the structural keyways, the matching structural keys being attached to one or more payload platforms. Finally, in operation 706, the one or more payload platforms are secured to the bulkhead panel by an insert pattern of structural inserts in the bulkhead panel. The method 700 may be further modified consistent with apparatus and system embodiments previously described.

This concludes the description including the preferred embodiments of the invention. The foregoing description been presented for the purposes of illustration and description. It is not intended to be exhaustive or to limit the invention to the precise forms disclosed. Many modifications and variations are possible within the scope of the foregoing teachings. Additional variations of embodiments of the invention may be devised without departing from the inventive concept as set forth in the following claims.

What is claimed is:

1. A launch vehicle interface, comprising:
    a bulkhead panel for being secured to a launch vehicle, the bulkhead panel comprising a honeycomb panel structure comprising a grid of interconnected hexagonal cells;
    a keyway pattern in the bulkhead panel for receiving matching key pattern attached to one or more payload platforms where each of the grid of interconnected hexagonal cells is formed from six segments to close an open keyway of the keyway pattern through the bulkhead panel and each of the six segments is shared with adjacent cells; and
    an insert pattern of structural inserts in the bulkhead panel for securing the one or more payload platforms;
    wherein the keyway pattern engages the matching keyway pattern and carries shear loads between the bulkhead panel and the one or more payload platforms and securing the one or more payload platforms by the insert pattern structurally ties the one or more payload platforms to a rocket body of the launch vehicle and each of the structural inserts is disposed in each segment of the grid of interconnected hexagonal cells.

2. The launch vehicle interface of claim 1, wherein the structural inserts comprise threaded inserts, each for receiving a bolt for securing the one or more payload platforms.

3. The launch vehicle interface of claim 1, wherein bulkhead panel comprises a composite material.

4. The launch vehicle interface of claim 1, wherein one or more structural keyways of the keyway pattern are cable pathways for routing one or more support cables.

5. The launch vehicle interface of claim 1, further comprising one or more additional bulkhead panels stacked on the bulkhead panel to support additional payload weight.

6. The launch vehicle interface of claim 1, wherein the one or more payload panels comprises plurality of payload panels.

7. The launch vehicle interface of claim 1, wherein the one or more payload panels support one or more satellites.

8. The launch vehicle interface of claim 1, wherein the one or more payload panels support one or more payload support systems and one or more payloads.

9. A method of coupling a payload to a launch vehicle, comprising the steps of:
- securing a bulkhead panel to a launch vehicle, the bulkhead panel having a keyway pattern, the bulkhead panel comprising a honeycomb panel structure comprising a grid of interconnected hexagonal cells;
- receiving a matching key pattern into the keyway pattern, the matching key pattern being attached to one or more payload platforms where each of the grid of interconnected hexagonal cells is formed from six segments to close an open keyway of the keyway pattern through the bulkhead panel and each of the six segments is shared with adjacent cells;
- securing the one or more payload platforms to the bulkhead panel by an insert pattern of structural inserts in the bulkhead panel;
- wherein the keyway pattern engages the matching keyway pattern and carries shear loads between the bulkhead panel and the one or more payload platforms and securing the one or more payload platforms by the insert pattern structurally ties the one or more payload platforms to a rocket body of the launch vehicle and each of the structural inserts is disposed in each segment of the grid of interconnected hexagonal cells.

10. The method of claim 9, wherein the structural inserts comprise threaded inserts, each for receiving a bolt for securing the one or more payload platforms.

11. The method of claim 9, wherein bulkhead panel comprises a composite material.

12. The method of claim 9, wherein one or more structural keyways of the keyway pattern are cable pathways for routing one or more support cables.

13. The method of claim 9, further comprising stacking one or more additional bulkhead panels on the bulkhead panel to support additional payload weight.

14. The method of claim 9, wherein the one or more payload panels comprises plurality of payload panels.

15. The method of claim 9, wherein the one or more payload panels support one or more satellites.

16. The method of claim 9, wherein the one or more payload panels support one or more payload support systems and one or more payloads.

17. A launch vehicle interface, comprising:
- a bulkhead panel means for securing to a launch vehicle, the bulkhead panel means comprising a honeycomb panel structure comprising a grid of interconnected hexagonal cells;
- a keyway means for receiving matching structural keys attached to one or more payload platforms, the keyway means disposed in a keyway pattern in the bulkhead panel where each of the grid of interconnected hexagonal cells is formed from six segments to close an open keyway of the keyway means through the bulkhead panel means and each of the six segments is shared with adjacent cells; and
- a structural insert means for securing the one or more payload platforms, the structural insert means disposed in an insert pattern of structural inserts in the bulkhead panel means;
- wherein the keyway means engages the matching structural keys and carries shear loads between the bulkhead panel means and the one or more payload platforms and securing the one or more payload platforms by the structural insert means structurally ties the one or more payload platforms to a rocket body of the launch vehicle and each of the structural inserts is disposed in each segment of the grid of interconnected hexagonal cells.

* * * * *